United States Patent Office 3,503,602
Patented Mar. 31, 1970

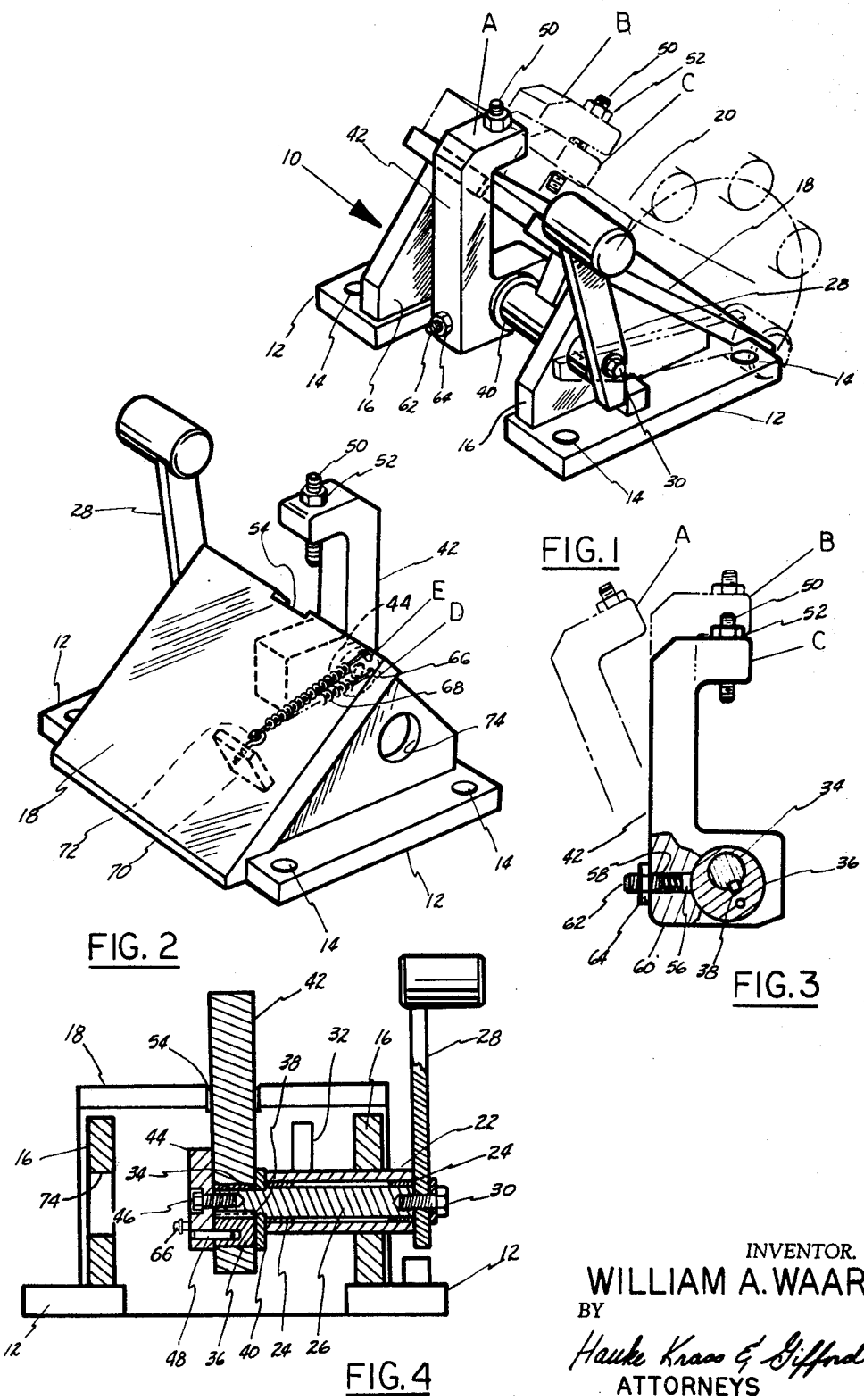

3,503,602
WORK-HOLDING CLAMP
William A. Waara, Detroit, Mich., assignor to Visi-Trol Engineering Company, Detroit, Mich., a corporation of Michigan
Filed Jan. 16, 1967, Ser. No. 609,676
Int. Cl. B25b 1/08, 1/00
U.S. Cl. 269—235                            7 Claims

ABSTRACT OF THE DISCLOSURE

A cam-actuated clamp having a rotatable shaft with an eccentric, cylindrical cam section providing a circumferentially slidable bearing surface for a clamping arm. Rotation of the shaft pivots the clamping arm from an inoperative position to an intermediate position wherein the work-engaging end of the clamping arm is radially spaced from the work piece relative to the axis of rotation. Continued rotation of the shaft causes the cam section to move the clamping arm radially into engagement with the workpiece.

BACKGROUND OF THE INVENTION

This invention relates to a clamp for use in engaging and retaining a workpiece with respect to a machine, and more particularly to such a clamp wherein the clamping arm is cam operated for a lateral movement toward the clamping area and then for movement generally perpendicular toward the clamping area and the workpiece.

A work clamp for a machine tool should be actuable between a first position wherein it presses a workpiece against a supporting surface, and a second position wherein it is retracted with respect to the clamping area so that workpieces may be inserted and removed therefrom. The present invention contemplates a clamp which may be actuated by suitable power means to either of the two positions and which is simple in construction so as to be low in cost and reliable in operation.

One measure of the merit of workpiece clamps is the freedom of access which they provide to the clamping area when they are in their retracted position. Conventional clamping devices employ a toggle mechanism for moving the clamping member movable into and out of the clamping area to provide access to the clamping surface so that workpieces may be loaded into or removed from the clamping area by direct motions. Toggle-type clamps have two major drawbacks when used in assembly operations, one of which is that the workpiece must be precisely positioned relative to the supporting surface to present an effective clamping point for the clamping arm. This is because toggle actuated clamping devices do not readily accommodate variations in the part or in the positioning of the part. A second problem commonly associated wtih toggle actuated clamping devices is that they tend to work loose from the workpiece under vibrations produced by a machine operation being performed on the workpiece.

SUMMARY OF THE INVENTION

The preferred embodiment of the present invention obviates the aforementioned problems associated with conventional clamping devices in addition to providing an improved clamping apparatus requiring relatively few parts and which is reliable in operation. The preferred embodiment of the invention, which will be subsequently described in detail, takes the form of a shaft member supported for rotation between a first position and a second position. A cylindrical cam member is eccentrically keyed to the shaft and provides a bearing surface for a clamping arm. The clamping arm is frictionally supported on the cam surface so that rotation of the shaft from a first extreme position to an intermediate position pivots the clamping arm from an inoperative position to an intermediate position wherein further pivotal movement of the clamping arm is restricted.

A work engaging member carried by the clamping arm is positioned in the intermediate position radially outward from the workpiece relative to the axis of the shaft. The workpiece is mounted on a supporting surface lying in a plane substantially perpendicular to a radius passing through the axis of rotation of the shaft. Continued rotation of the shaft and cam from the shaft's intermediate portion toward its second extreme position moves the work-engaging member of the clamping arm toward the supporting surface into engagement with the workpiece. By reversing the rotation of the shaft, the work-engaging member is separated from the workpiece and moved laterally away from the clamping area of the supporting surface.

The preferred embodiment of the present invention provides substantial advantages over conventional clamping devices in a number of aspects. First, the cam actuated clamping arm tends to tighten under vibratory conditions so that its clamping engagement with the workpiece is never reduced. This tendency to tighten with the workpiece is not coupled with an increased release effort as is common with toggle actuated clamps. Thus, when the machining operation has been performed on the workpiece, the clamping arm is readily movable from an operative condition to an inoperative condition permitting full access to the workpiece for work transfer means.

It is therefore an object of the present invention to provide a clamping device having a clamping arm which is movable from an initial position laterally spaced from the clamping area toward an intermediate position over the workpiece and the supporting surface and then toward an engaged position with the workpiece.

It is another object of the present invention to provide a clamping device having a clamping arm supported by a rotatable shaft for pivotal movement toward the clamping area and then a generally radial movement toward the workpiece mounted on a supporting surface lying in a plane generally perpendicular to a radius of the axis of rotation of the shaft.

It is another object of the present invention to provide a clamping arm supported by an eccentric cylindrical cam element carried by a rotatable shaft in such a manner that as the shaft is rotated from a first position to a second position, the clamping arm is initially moved with the cam element from a first pivotal position, in which the arm is laterally spaced from the workpiece, to a second pivotal position, in which a work-engaging element on the arm is spaced over the workpiece. And then toward a third position wherein the clamping arm is rotated relative to the cam element to engage the workpiece.

Still further objects and advantages of the present invention will readily occur to one skilled in the art to which the invention pertains upon reference to the following detailed description.

DESCRIPTION OF THE DRAWINGS

The description makes reference to the accompanying drawing in which like reference characters refer to like parts throughout the several views and in which FIG. 1 is a perspective view of a clamping device illustrating a preferred embodiment of the present invention with the clamping arm shown in a retracted position and other positions shown in phantom;

FIG. 2 is a perspective view of the clamping device illustrated in FIG. 1 illustrating the spring means for retaining the clamping arm in a fully retracted or fully engaged position;

FIG. 3 is an elevational sectional view taken along one side of the clamping arm with parts in section for purposes of clarity; and FIG. 4 is an elevational sectional view taken along the axis of the shaft.

DESCRIPTION OF THE PREFERRED EMBODIMENT

Referring to the drawing, the preferred embodiment illustrating the present invention comprises a frame, generally indicated at 10, adapted to be mounted on a suitable working surface as a component of an assembly machine (not shown). The frame 10 comprises a pair of spaced apart plate sections 12 provided with apertures 14 for attachment to a supporting surface. A pair of spaced apart sections 16 extend upwardly from each of the supporting plates 12 and are interconnected by a supporting plate 18 which provides a mounting surface for a workpiece 20. The workpiece 20 is clamped on the supporting plate 18 in a rigid manner while a machine operation is performed thereon.

A sleeve 22 is fixed to one of the uprights 16 as can best be seen in FIG. 4. A pair of spaced apart bushing members 24 are carried within the sleeve 22 to provide means for journaling an elongated shaft 26. A handle 28 is fixed to the outer end of the shaft 26 by a threaded fastener 30 or other suitable fastening means. It is to be understood that the handle 28 is intended to illustrate a connection between the shaft 26 and a source of power. The preferred embodiment is illustrated, for purposes of description as being capable of being actuated manually; however, a crank linkage to a prime mover such as a reciprocating hydraulic cylinder, air cylinder or the like may be operatively connected to rotate the shaft between a pair of extreme working positions.

A stiffener member 32 is fixed to the underside of the supporting plate 18 with its lower end affixed as by welding or the like to the sleeve 22 to provide longitudinal stability for the inner end of the sleeve.

The inner extending end of the shaft 26 is narrowed as at 34 with a length to accommodate the bore of a cam 36 having a cylindrical contour formed about an axis that is supported parallel to the axis of rotation of the shaft 26. The cam 36 is eccentrically mounted on the narrowed end 34 and fixed against relative rotation with respect to the shaft by a key 38. Thus, it is to be understood that the cam 36 is rotated about the axis of the shaft whenever the shaft 26 is rotated with respect to the supporting plate 18.

A spacer member 40 is mounted on the narrowed end 34 of the shaft adjacent the end of sleeve 22.

A C-shaped clamping arm 42 is carried by the shaft 26 with its lower arm bored to receive the cam 36. It is to be understood that there is a sliding fit between the bearing surface of the cam 36 and the bore of the clamping arm 42. The spacer 40 provides a bearing surface between the end of the sleeve 22 and the clamping arm 42.

A retainer plate 44 is fixed to the narrowed end 34 of the shaft by a threaded fastener 46 and functions to prevent longitudinal displacement of the clamping arm 42 and the cam 36. A pin 48 connects the retainer plate 44 to the cam 36 and functions to keep the retainer plate 44 properly oriented relative to the shaft 26 and the cam 36.

The body of the clamping arm 42 extends above the supporting plate 18. The upper arm of the clamping arm 42 carries an elongated threaded clamping member 50 which is rigidly locked thereto preferably by a lock nut 52. The clamping member 50 is arranged with its longitudinal axis generally normal to the axis of rotation of the cylindrical cam 36. The position of the clamping member 50 on the arm 42 is adjusted so that when the clamping arm 42 is in the clamping position, the lower end of the clamping member tightly engages the workpiece 20.

The clamping arm 42 is pivotable between a retracted position illustrated in FIGS. 1 and 3 as at A and an intermediate position illustrated at B wherein the clamping arm 42 abuts the peripheral edge of the supporting plate 18 preferably at a position defined by a slot 54. Thus, it can be seen that the plate 18 limits the pivotal motion of the clamping arm 42 as the handle is rotated toward the plate 18 and preferably defines a position wherein the clamping member 50 is substantially normal to the workpiece mounting surface of the supporting plate 18. In order to produce this pivotal motion of the clamping arm 42 in which it is moved as the shaft 26 is rotated, a frictional locking member 56 is disposed in a bore 58 in the lower end of clamping arm 42, which faces the cylindrical contour of the cam 36. The frictional locking member 56 is urged against the cam 36 by a spring member 60, and a threaded stud member 62. The stud member 62 is adjusted such that it pretensions compresses the spring 60 to provide a frictional force on the cam such that the clamping arm 42 can be pivoted with the cam 36 when the handle 28 is moved. A locking nut 64 maintains the stud 62 in its desired position.

Thus, it can be seen that as the shaft 26 is rotated from a rearward position of the handle 28, the clamping arm 42 is initially pivoted from its fully retracted position A to the position B wherein its pivotal movement with the cam is limited by the slot 54. Continued rotation of the shaft 26 in the same direction, rotates the cam 36 with respect to the clamping arm 42 such that its outer end is moved toward the axis of rotation of the shaft 26. As the clamping arm 42 is moved such that it slides relative to the cylindrical contour of the cam 36, the clamping member 50 moves substantially normally to the supporting surface of the supporting plate 18 to engage the workpiece 20. This secondary movement of the clamping arm 42 is between positions B and C, position C representing the fully engaged position of the clamping member 50 and the workpiece 23. Thus the frictional locking member 62 permits rotation between the clamping arm 42 and the cam 36 during this secondary clamping motion but fixes the clamping arm against rotation with respect to the cam during the initial clamping motion.

To release the workpiece, the shaft 26 is rotated in the opposite direction to produce relative movement between the cam 36 and the clamping arm 42 until the clamping member 50 is separated from the workpiece 20. The cam 36 and the clamping arm 42 then move as a unit in which they are connected by the frictional locking member 56, rearwardly to the fully retracted position A. It can be seen that as the clamping arm 42 moves from its fully engaged position C to its fully retracted position A that the clamping member 50 is moved laterally away from the clamping area in a motion having a component parallel to the supporting surface of the plate 18 so that full access is permitted to the clamping area for suitable work transfer means (not shown).

To assist the retention of the clamping arm 42 in the fully retracted position or in the fully engaged position, a connector member 66 such as a pin or the like, carried by retainer plate 44 engages the free end of an over-center spring 68. The opposite end of the spring 68 is attached to a support member 70 by a suitable hook member 72. The spring 68 and the connector member 66 are arranged such when the arm 42 is in its clamping position the connector member is in a first position illustrated at E in which the spring 68 urges the clamping member 42 toward the supporting plate 18, and in the fully retracted position of the arm 42 the connector member is in an over-center position illustrated at D in which the spring 68 biases the arm, away from the supporting plate 18. Thus the spring 68 functions to bias the clamping arm 42 toward either its clamping position or its retracted position.

An access opening 74 is provided in the upright 16 to permit a suitable tool to engage the threaded fastener 46.

It can be seen that I have described an improved clamping device having a clamping arm 42 which is pivotally moved from a retracted position, spaced from the clamping area, to an operative position over the workpiece in a first path of motion as the cam is rotated through the initial portion of the stroke of the handle 28, and then is cammed toward the workpiece in a second path of motion as the handle completes its stroke. When the machine operation has been performed on the workpiece 20, the clamping member 50 is quickly disengaged from the workpiece and the clamping arm 42 retracted to its fully retracted position permitting full access to the workpiece and the clamping area by rotation of the handle in the reverse direction.

Although I have described but a single embodiment of my present invention, it is to be understood that various modifications and revisions can be made therein without departing from the spirit of the invention or the scope of the appended claims.

Having described my invention, I claim:

1. A clamping device comprising:
   (a) a support;
   (b) a shaft mounted on said support for rotation on a fixed first axis;
   (c) a cylindrical cam secured to said shaft on a second axis eccentrically offset from said first axis and parallel thereto;
   (d) a clamping member carried by said cam for rotation thereon about said second axis;
   (e) means coacting between said cam and clamping member to restrain same against relative rotation upon rotation of said shaft from a first to a second position to thereby move said clamping member in a first path relative to said support;
   (f) said support having means engaging said clamping member when the shaft is in said second position to restrain movement of said clamping member in said first path and overcome said coacting means to thereby cause said clamping member to rotate relative to said cam upon further rotation thereof to a third position and to move in a second path relative to said support.

2. The combination as defined in claim 1, in which the support has a planar surface for mounting a workpiece in a clamped position, and the clamping member is supported such that its motion along its first path has a component parallel to said planar surface, and its motion along its second path has a component normal to said planar surface.

3. The combination as defined in claim 1, including a bias member connected between the clamping member and the cam to urge the clamping member toward motion, as the shaft is rotated, in the direction in which the cam is rotated with the shaft.

4. The combination as defined in claim 1, in which said means engaging said clamping member comprises a stop on the support disposed in the first path of motion of the clamping member, the stop being so formed that as the shaft is rotated from its first position, the clamping member rotates with the cam at such times as the clamping member is separated with respect to the stop, and is rotated with respect to he cam a such times as the clamping member is engaged with the stop.

5. A clamping device as defined in claim 1, in which said coacting means comprises a locking member mounted on the clamping member and arranged to be frictionally engaged with a bearing surface provided on the cam, and a bias member urging the locking member toward the cam such that the cam biases the clamping member toward motion, as the shaft is rotated, in the direction of rotation of the shaft.

6. A clamping device as defined in claim 5, including means on the clamping member for varying the bias of the bias member on the locking member.

7. A clamping device as defined in claim 1, in which said clamping member comprises an arm extending from said cam and in a plane normal to the axis of said shaft, said arm having a clamping end movable in the aforesid first and second paths such that it moves along its second path toward the axis of rotation of the shaft as the shaft is rotated from its second toward its third position.

References Cited

UNITED STATES PATENTS

| 2,865,643 | 12/1958 | Parker | 276—106 |
| 3,170,214 | 2/1965 | Cochrane | 269—228 X |
| 595,662 | 12/1897 | Steele | 269—236 X |

FOREIGN PATENTS

| 311,432 | 3/1919 | Germany. |

OTHELL M. SIMPSON, Primary Examiner

LEON GILDEN, Assistant Examiner

U.S. Cl. X.R.

269—157, 254